United States Patent

[11] 3,600,808

[72] Inventor James Jackson Reeve
 940 Vistavia Circle, Decatur, Ga. 30033
[21] Appl No 4,935
[22] Filed Jan. 22, 1970
[45] Patented Aug. 24, 1971

[54] ANTERIOR ROOT-TORQUING AUXILIARY WIRE
 7 Claims, 9 Drawing Figs.
[52] U.S. Cl. 32/14 A
[51] Int. Cl. A01c 7/00
[50] Field of Search 32/14 A, 14 F

[56] References Cited
UNITED STATES PATENTS

| | | | |
|---|---|---|---|
| 2,494,540 | 1/1950 | Brusse | 32/14 |
| 2,495,692 | 1/1950 | Brusse | 32/14 |
| 3,302,288 | 2/1967 | Tepper | 32/14 |

Primary Examiner—Robert Peshock
Attorney—Newton, Hopkins & Ormsby

ABSTRACT: This invention relates to an auxiliary root-torquing wire for use with a main dental arch wire for applying torque to the root structure of a group of teeth. More particular, this invention is an anterior root-torquing auxiliary wire detailed to move the roots of the maxillary or mandibular anterior teeth either lingually or labially. The auxiliary root-torquing wire includes an integrally formed wire having a generally circular configuration and including a series of radially projecting substantially U-shaped bent portions. The radially extending U-shaped bent portions are detailed to be substantially coplanar relative to each other and the ends of the integrally formed wire includes hooked end portions detailed for engagement with a main dental arch wire. The present invention also includes the method of applying the auxiliary root-torquing wire to a main dental arch wire by hooking a first end of the auxiliary torquing wire to the main dental arch wire adjacent to one end, inserting a first one of the U-shaped bent portions behind the main dental arch wire between adjacent teeth in an interdental space, progressively inserting each of the other U-shaped bent portions behind the main dental arch wire between still other adjacent teeth interdental spaces, and hooking the second end of the auxiliary torquing wire adjacent to a second end of the main dental arch wire.

PATENTED AUG 24 1971
3,600,808
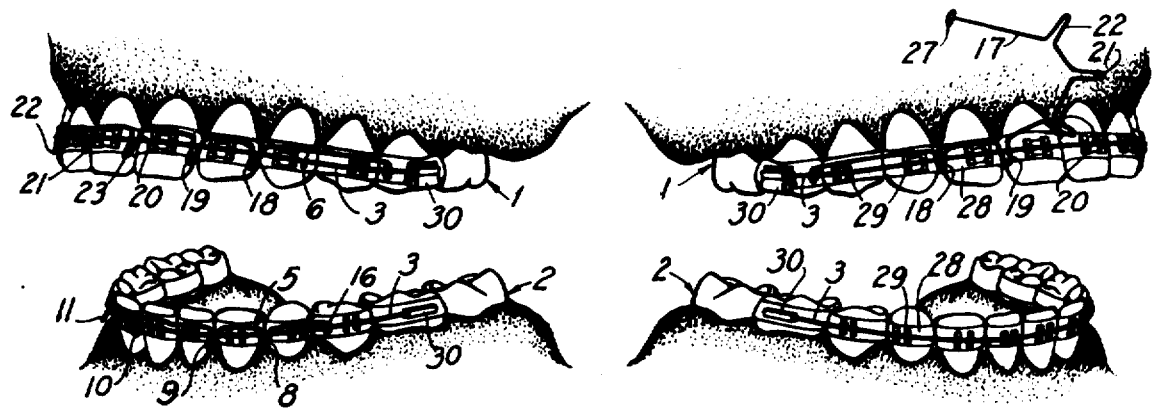
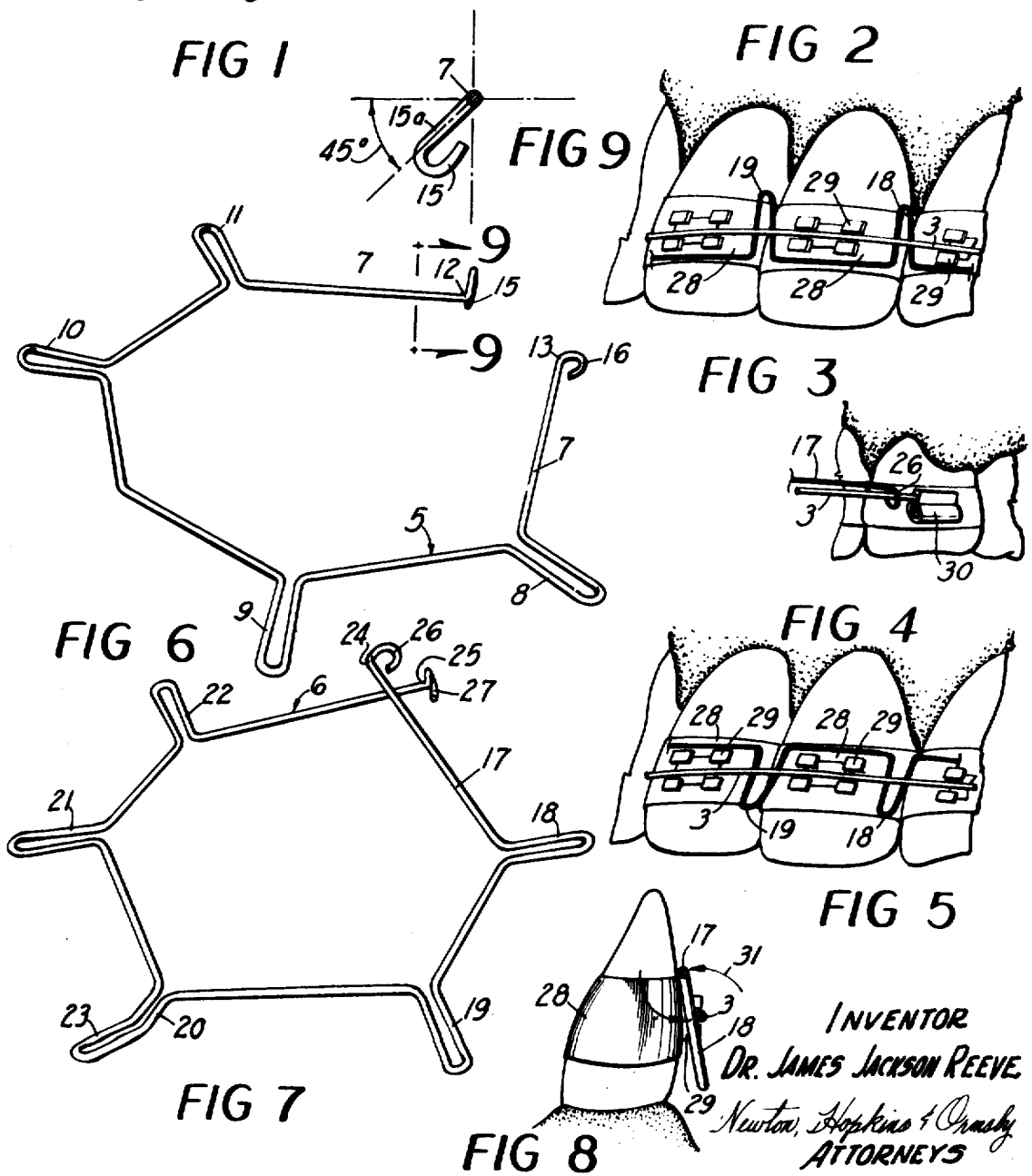
INVENTOR
DR. JAMES JACKSON REEVE
Newton, Hopkins & Ormsby
ATTORNEYS

ANTERIOR ROOT-TORQUING AUXILIARY WIRE

BACKGROUND OF THE INVENTION

Orthodontic practice requires the application of bands around teeth, with a main arch wire attached to the bands and anchored adjacent its opposite end to a molar tooth. The purpose of the main arch wire is to aid in changing the position of certain teeth relative to each other. Further, it is often necessary to change the root position of certain teeth by applying torque to the teeth to cause the root structure to be moved either lingually, labially, mesially or distally.

Prior art orthodontic appliances for use in applying torque to the root structure of teeth have been complicated in construction, uneconomical to manufacture, time consuming for installation and unreliable in operation. Further, the prior art root-torquing devices required special band structure for use in connecting the main dental arch wire and providing a connection for the root-torquing wire. Also, the prior art root-torquing appliances usually presented unnecessary surfaces which trap food against the surface of the tooth resulting in a decay of the tooth. Many of the prior art torquing appliances presented sharp edges or points which would come in contact with the teeth or gums to irritate them over a period of use of the torquing appliances. Some of the prior art root-torquing appliances could not be used at the same time that other orthodontic appliances were being used, such as uprighting springs. In the orthodontic practice, when the arch wires were used in combination with prior art torquing devices, it was necessary to use special tools for installing and removing the auxiliary torquing appliance. The use of the special tools and complicated mounting structures of the prior art torquing devices were time consuming and increased the unpleasantness of the dental operation on the patient.

SUMMARY OF THE INVENTION

It is a primary object of this invention to overcome the foregoing deficiencies and objections of the prior art devices.

Another object of this invention is to provide an auxiliary root-torquing wire which is simple in construction, economical to manufacture and reliable in operations.

An additional object of this invention is to provide an auxiliary root-torquing wire which levels the arch and uprights the molars.

A further object of this invention is to provide an auxiliary root-torguing wire which is capable of lingual root movement of the maxilliary anterior teeth.

A still further object of the invention is to provide an auxiliary root-torquing wire which is effective to provide labial root movement of the maxilliary anterior teeth.

Still another object of this invention is to provide an auxiliary root-torquing wire which is effective to provide lingual root movement of the mandibular anterior teeth.

A further object of this invention is to provide an auxiliary root-torquing wire which is effective to provide labial root movement of the mandibular anterior teeth when their roots are in lingual position in the symphysis.

Another object of this invention is to provide an auxiliary root-torquing wire which is effective to provide lingual crown movement of the mandibular anterior teeth in cases where they are inclined toot far labially.

Still another object of this invention is to provide an auxiliary root-torquing wire which is effective to provide labial crown movement where the mandibular anterior teeth are tipped lingually.

A still further object of this invention is to provide an auxiliary root-torquing wire which is capable of being positioned on the main arch wire without the use of special tools.

A further object of this invention is to provide an auxiliary root-torquing wire wherein the torquing action is effective to provide a gentle pressure over the length of time necessary in correcting the crown or root positions.

Another object of this invention is to provide an auxiliary root-torquing wire capable of being installed completely independently of other auxiliaries or arch wires.

Still other objects and advantages of the details of construction will become apparent after reading the following description of one illustrative embodiment of the invention with reference to the attached drawings wherein like reference characters have been used to refer to like parts throughout the several figures of drawings.

BRIEF DESCRIPTION OF THE FIGURES OF DRAWINGS

FIG. 1 is a left front perspective view illustrating the use of the auxiliary torquing wire of the present invention in place both on an upper and lower dental structure.

FIG. 2 is a right front perspective of an upper and lower dental structure illustrating the method of attachment of the auxiliary torquing wire to the main dental arch wire.

FIG. 3 is an enlarged fragmentary vertical plane view illustrating the position of the auxiliary torquing wire U-shaped bend located behind the main arch wire.

FIG. 4 is an enlarged fragmentary elevational view showing the details of one end of the auxiliary torquing wire hooked to the main arch wire.

FIG. 5 is an enlarged fragmentary elevational view showing the auxiliary torquing wire located on the main arch wire for torquing the root structure of a tooth in an opposite direction than illustrated in FIG. 3.

FIG. 6 is a perspective view of a second auxiliary torquing wire for use on the lower dental structure.

FIG. 7 is a perspective view of a second auxiliary torque wire for use on the upper dental structure.

FIG. 8 is a vertical sectional view showing the auxiliary torquing wire positioned relative to a main arch wire for applying labial torquing force to the root structure of a mandibular tooth.

FIG. 9 is an enlarged fragmentary sectional view taken along lines 9—9 of FIG. 6 showing the details of one end of the auxiliary torquing wire formed hook portion.

DESCRIPTION OF THE ILLUSTRATIVE EMBODIMENTS

The function of the auxiliary torquing wire of the present invention is to provide a gentle torquing pressure to aid in correcting the root structure of the teeth. The auxiliary torquing wire of the present invention is detailed for use with conventional main arch wire normally used by orthodontics in performing still other corrective positioning of the teeth.

Referring now, in particular to FIGS. 1 and 2, the present invention will be described with reference to an upper dental structure 1, a lower dental structure 2, a main dental arch wire 3, and the auxiliary torquing wires 5 and 6.

As shown in FIG. 6, the auxiliary torquing wire 5 for use on the lower dental structure includes a length of wire 7 formed in a generally circular configuration and includes four U-shaped bends 8, 9, 10 and 11 formed thereon intermediate the ends of the wire 7. The U-shaped bends are detailed and formed relative to the generally circular configuration of wire 7 such that the U-shaped bends 8 through 11 projecting radially outwardly from the generally circular configuration. Further, the U-shaped bends 8–11 are detailed to be substantially coplanar relative to each other. The ends 12, 13 of the wire 7 are detailed to be coplanar and slightly spaced relative to each other. The ends 12 and 13 of the length of wire 7 includes a formed hook portion 15, 16 detail for hooking engagement with a main dental arch wire as will be described hereinbelow.

Referring now particularly to FIG. 7, the auxiliary torquing wire 6 for use on the upper dental structure includes of wire 17 formed in a generally circular configuration and includes five U-shaped bends 18, 19, 20, 21 and 22. The U-shaped bends 18–22 are detailed in design relative to the generally circular configuration of the length of wire 17 such that the U-shaped bends project radially outward from the circular configuration. Further, the U-shaped bends 18–22 are detailed relative to each other to be substantially coplanar. The center U-shaped bend 20 is formed to include an upturned end portion 23 which is detailed to aid in retaining the auxiliary torquing wire in position as will be described hereinbelow in the method of application of the auxiliary torquing wire.

The length of wire 17 includes two ends 24 and 25 which are detailed in form to be overlapping and slightly inwardly spaced relative to each other. Further, the ends of the wire 24, 25 includes formed hook portions 26, 27 which are detailed for hooking engagement with a main dental arch wire.

Referring now to FIG. 9, the hook portions 15, 16, 26 and 27 are formed relative to the lengths of wire 7, 17 to include a connecting position 15a (only one of which is illustrated in FIG. 9) which extends from the length of wire 7, 17 such that the connecting portion is disposed substantially 45° relative to the plane of the generally circular configuration to facilitate hooking engagement with the main dental arch wire.

METHOD OF APPLICATION

In describing the method of application of the above described auxiliary torquing wire 5, 6, reference will be made to the main dental arch wires illustrated in FIGS. 1 and 2. The dental arch wire as illustrated in FIGS. 1 and 2 includes a main arch wire 3, a tooth band 28, a bracket 29 for attaching the main dental arch wire 3 to the tooth band, and a buccal tube 30 which is attached to one of the tooth bands for connecting an end portion of the main dental arch wire 3.

As above described, the auxiliary torquing wires including a first torquing wire 5 for use on the lower dental structure and a second auxiliary torquing wire 6 for use on the upper dental structure. Since the method of application of the torquing wires 5 and 6 to the main dental arch wire is identical, the method of applying only one of the wires will be described herein. Referring now particularly to FIG. 2, the upper auxiliary torquing wire 6 is connected to the main dental arch wire 3 by hooking one end 24 to the main dental arch wire 3 by means of the formed hook portion 26. The first U-shaped bend 18 is then inserted behind the main arch wire 3 and in an interdental spaced between adjacent teeth as shown in FIGS. 2 and 3. The remaining U-shaped bent portions 19–22 are progressively inserted behind the main arch wire 3 with each of the U-shaped bent portions 19–22 inserted in an interdental space between still other adjacent teeth as illustrated by the dotted lines of the FIG. 2. The U-shaped bent portions 19–22 are progressively inserted behind the arch wire 3 by unrolling the circular configuration of the auxiliary torquing wire 6 as shown in FIG. 2. After the last U-shaped bent portion 22 has been inserted behind the main wire 3 the hook portion 27 is then attached to the main arch wire 3 adjacent an opposite end from the hook portion 26.

It is to be understood that the auxiliary torquing wire can be inserted either from top to bottom as seen in FIG. 5 or can be inserted from bottom to top as shown in FIG. 3. The change in direction of inserting the auxiliary torquing wire will reverse the torquing force applied to the root structure of the teeth. Reference is made to the illustration in FIG. 8 which shows a mandibular auxiliary torquing wire inserted from top to bottom whereby the U-shaped bent portion is spring-biased outwardly and the straight portion is spring-biased inwardly to apply a torquing force against the labial surface of the crown portion of the tooth represented by the arrow 31. This particular arrangement of the auxiliary torquing wire will apply a torquing force to torque the root structure of the tooth labially and the crown portion lingually. By reversing the direction of application of the torquing wire to position the U-shaped bent portion from bottom to top, the torquing direction on the root structure and crown will be reversed.

The formed end portion 23 of the auxiliary torquing wire 6 is detailed to be inserted behind the main arch wire 3 and is bent slightly outwardly as illustrated in FIG. 1. The formed end portion 23 of the auxiliary torquing wire 6 will aid in retaining the auxiliary torquing wire in place behind the main dental arch wire.

As above stated, the method of application of the lower auxiliary torquing wire 5 is identical to the application of the upper auxiliary torquing wire 6 as above described.

It now becomes apparent that the above described illustrative embodiment of the auxiliary torquing wire is capable of obtaining the above-stated objects and advantages. Further, it is obvious that those skilled in the art may make modification in the details of construction without departing from the spirit of the invention which is to be limited only by the scope of the appended claims.

1. An auxiliary wire for use in applying torquing action to the roots of a series of teeth comprising, an integral length of wire formed in a generally circular configuration, said length of wire including a series of substantially U-shaped bends formed intermediate the ends thereof, all of said bends detailed to project radially outward from said circular configuration and detailed relative to each other to be in substantially coplanar relationship, one of said U-shaped bends including an upwardly formed end portion detailed to maintain an intermediate portion of said wire in position, and hook means formed on the ends of said length of wire for maintaining said torquing wire in position.

2. An auxiliary wire as described in claim 1, further characterized in that the formed circular configuration said wire is detailed such that the ends of said length of wire slightly overlap each other.

3. An auxiliary wire as described in claim 1, further characterized in that the formed circular configuration of said wire is detailed such that the ends of said length of wire are coplanar and slightly spaced relative to each other.

4. An auxiliary wire as described in claim 1, further characterized in that said series of U-shaped bends consist of five bends.

5. An auxiliary wire as described in claim 1, further characterized in that said series of U-shaped bends consist of four bends.

6. In a method of applying a preformed circular auxiliary torquing wire having a series of radially projecting U-shaped bends to a main dental arch wire, consisting of the steps of:
   a. hooking a first end of said circular torquing wire with the main arch wire adjacent a first end of the main arch wire;
   b. inserting a first U-shaped bend behind the main arch wire and in an interdental space between adjacent teeth;
   c. progressively inserting each of said other U-shaped bends behind the main arch wire and in an interdental space between still other adjacent teeth, by unrolling said preformed circular torquing wire; and,
   d. hooking the second end of said circular torquing wire with the main arch wire adjacent a second end of the main arch wire.

7. In a method of applying torquing action to the root structure of a plurality of teeth having a main dental arch wire thereon, consisting of the steps of:
   a. forming a length of wire into a generally circular configuration having a series of radially projecting U-shaped bends intermediate the ends thereof;
   b. hooking a first end of said circular torquing wire with the main arch wire adjacent a first end of the main arch wire;
   c. inserting a first U-shaped bend behind the main arch wire and in an interdental space between adjacent teeth;
   d. progressively inserting each of said other U-shaped bends behind the main arch wire and in an interdented space between still other adjacent teeth;
   by unrolling said preformed circular torquing wire; and,
   e. hooking the second end of said circular torquing wire with the main arch wire adjacent a second end of the main arch wire.